Feb. 17, 1959 R. S. CONDON 2,873,774
POWER SAW FOR FORMING OVAL BOWLS OR THE LIKE
Filed March 7, 1957 4 Sheets-Sheet 1

INVENTOR.
ROBERT S. CONDON
BY
Richard von H. Burns
Attorney

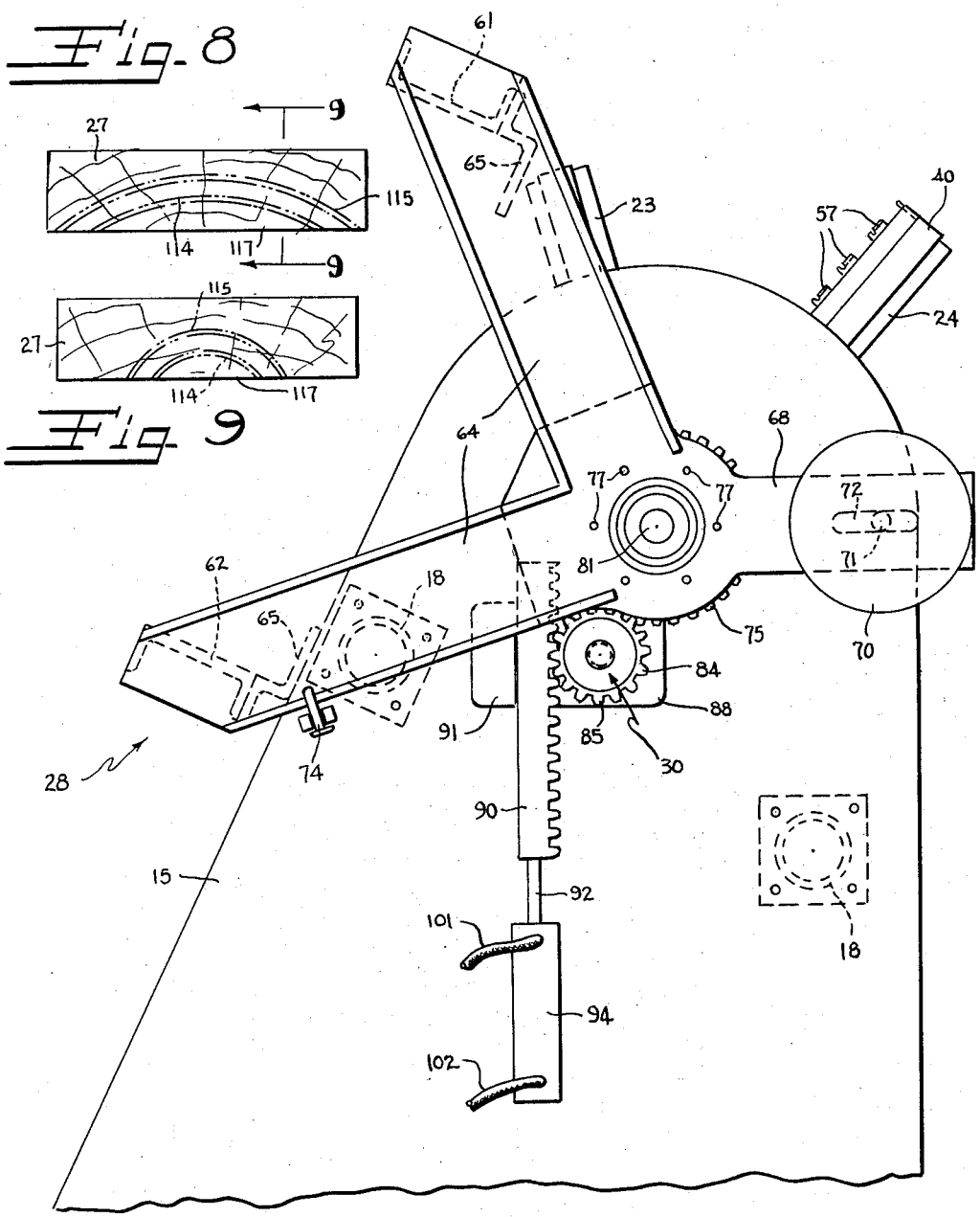

Feb. 17, 1959 R. S. CONDON 2,873,774
POWER SAW FOR FORMING OVAL BOWLS OR THE LIKE
Filed March 7, 1957 4 Sheets-Sheet 4
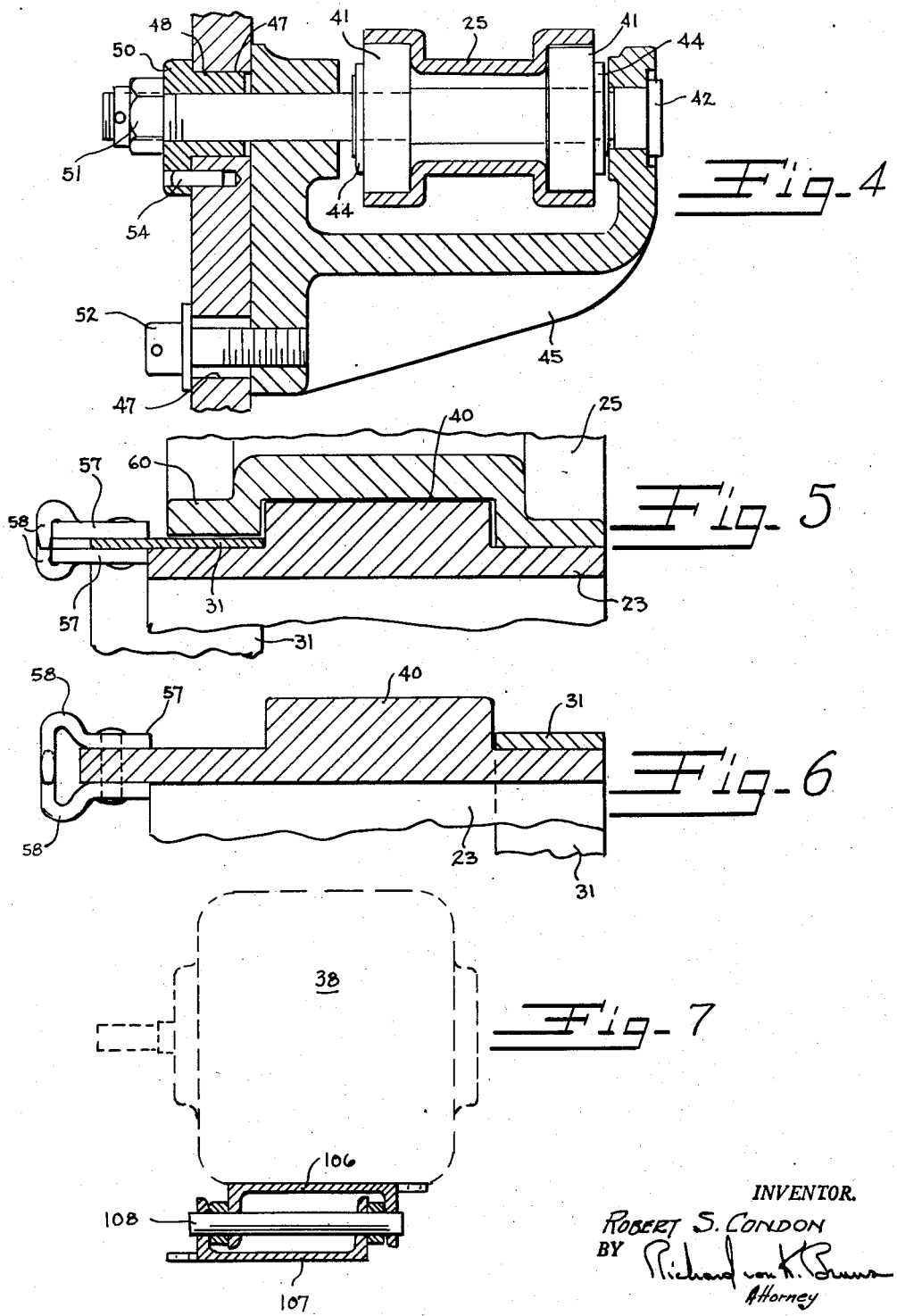
INVENTOR.
ROBERT S. CONDON
BY
Attorney

United States Patent Office 2,873,774
Patented Feb. 17, 1959

2,873,774
POWER SAW FOR FORMING OVAL BOWLS OR THE LIKE

Robert S. Condon, Berlin, Conn., assignor to Adirondack Bowls, Inc., Old Forge, N. Y., a corporation of New York Application March 7, 1957, Serial No. 644,540

12 Claims. (Cl. 143—85)

This invention relates generally to power sawing apparatus, and has particular reference to a novel saw which is adapted to form an oval, bowl shaped article in a single operation.

Essentially, the present invention provides for the movement of a work piece through an arcuate path into successive cutting engagement with arcuate portions of a pair of annular saw tooth carrying members lying in planes radial to the work piece path. The annular members are of unequal diameter so that two concentric cuts or kerfs are made in the work piece during a single pass thereof through its arcuate path, these cuts being arcuate in both the transverse and longitudinal directions of the work piece due to the relative movement of the parts. However, since the arcuate path of the work piece has a larger radius than either of the annular saw tooth carrying members, the concentric cuts will have larger radii in the longitudinal direction than in the transverse direction so that the article formed will be in the shape of a segment of a torus, or, of an oval bowl.

The applicant is familiar with the prior art, and is aware of the fact that annular or ring-shaped saws have been employed heretofore for making a semi-circular cut in a piece of wood or the like, or for making semi-annular articles of various types. Some of the prior art devices have even made provision for moving a work piece through an arcuate path into engagement with an annular saw, as, for example, in the manufacture of barrel staves. However, in all of these previous developments, the inner and outer sides of the barrel stave or of the semi-annular articles are formed in separate steps as by making two separate passes of the work piece through the saw machine, or by making separate passes through different saw blades. None of the prior art devices, insofar as the applicant can ascertain, provide for simultaneously forming both sides of the article in a single operation, nor do any of them make provision for forming an oval, bowl shaped article in a single operation as in the present invention.

One of the principal uses contemplated for the present invention is in the manufacture of oval bowls of wood such as salad serving bowls, and the like. While the manufacture of round bowls has not presented any particular problems in the past, the manufacture of an oval bowl has always been considerably more difficult because of its irregular shape. Thus, several different steps are usually required in order to rough form the bowl, and thereafter the bowl must be finished by hand because it has not been possible to follow the oval shape with conventional finishing equipment such as planers or the like. This, of course, greatly increases the time and labor needed to produce an oval bowl, and results in a much higher cost. With the present invention, on the other hand, the bowl can be rough formed in a single operation and, since the arcuate contours of the rough bowl are true arcs of a circle in both the longitudinal and transverse directions, the bowl can be finished by machines making use of this true geometrical shape.

Accordingly, with the foregoing and other considerations in view, it may be stated that the broad object of the present invention is to provide a saw machine which is capable of making two concentric cuts in a work piece in a single operation.

Another equally important object of the invention is to provide a saw machine which is capable of rough forming an oval, bowl shaped article in a single operation.

Still another important object of the invention is to provide a saw machine capable of forming an oval, bowl shaped article wherein the arcuate contours of the article are true arcs of a circle in both the longitudinal and transverse directions so that the finishing of the article by machine methods is greatly facilitated.

A further important object of the invention is to provide a saw machine for forming an oval, bowl shaped article, or an article in the form of a segment of a torus, which machine is relatively simple in construction and operation.

A more specific object of the invention is to provide a saw machine for forming an oval, bowl shaped article wherein the cutting is effected by a pair of radially disposed annular saw members of unequal diameter, the member with the smaller diameter being arranged for first engagement with the work piece whereby the inner cut is completed first while the article being formed is still connected to the work piece.

Other objects and advantages of the invention will become apparent from the following detailed description thereof read in conjunction with the accompanying drawings which illustrate a representative embodiment of the invention for the purpose of disclosure.

In the drawings:

Figure 3 is a side elevation of the left side of the machine;

Figure 4 is an enlarged section through one of the roller assemblies of the machine;

Figure 5 is an enlarged section through one of the annular saw tooth carrying members showing one method of supporting the saw teeth thereon;

Figure 6 is a view corresponding to Figure 5 showing another method of supporting the saw teeth on the ring;

Figure 7 is a transverse section through one of the rockable motor supports of the machine;

Figure 1:
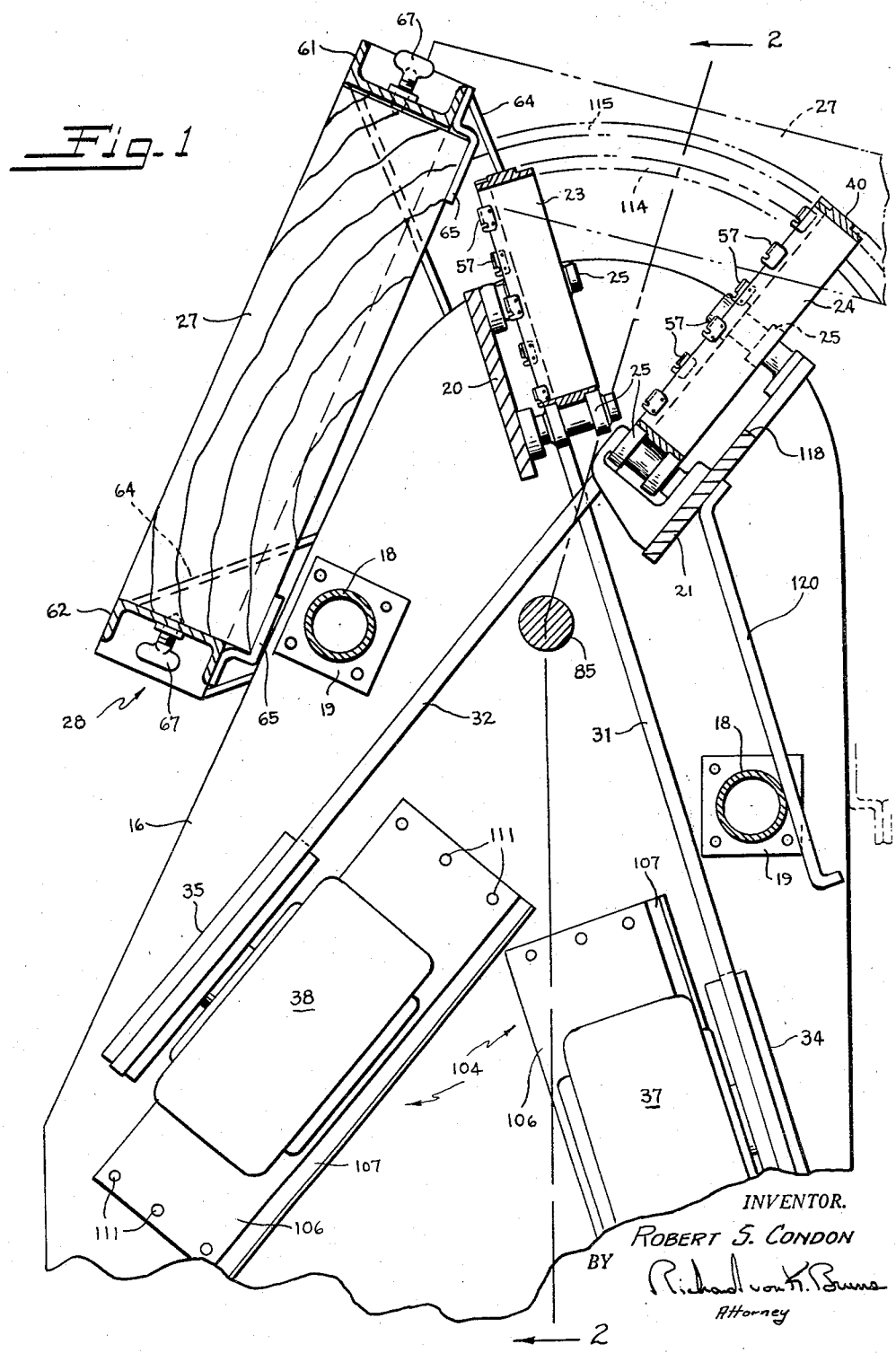
Figure 1 is a vertical section through a saw machine embodying the invention, the section being taken just inside the left hand side plate of the machine and looking toward the right as indicated by the line 1—1 of Figure 2.

Figure 8, Sheet 3, is a longitudinal vertical section through a work piece showing the manner in which the concentric cuts are made therein by the machine; and Figure 9 is a transverse vertical section through the work piece taken substantially along line 9—9 of Figure 8.

Having reference now to the drawings, wherein like reference numbers designate the same parts in each of the views, the machine is provided with a supporting frame comprised of a pair of spaced, parallel side members or plates 15, 16 which are secured together as by a plurality of transversely extending tubular members 18. Butt plates 19 are welded to the opposite ends of each tubular member and these in turn are secured to the side members 15, 16 by bolting or welding. The bottoms of the side members are adapted to rest upon the workshop floor and be secured thereto by any suitable means.

Extending transversely between the side members 15, 16, adjacent the upper edges thereof, are a pair of angularly disposed plates 20, 21 which respectively support annular rings 23, 24 by means of a plurality of rollers 25 to be described. The rings 23, 24 support the saw teeth or cutting means and are located so that they project into the arcuate path of a work piece 27 carried by a carriage 28 which is pivotally secured to the side members 15, 16 at 30, Figures 2 and 3. The transverse plates 20, 21 are arranged so that the rings 23, 24 are supported in divergent planes extending substantially radially from the pivotal axis of the carriage through the points 30—30. Stated another way, it may be said that the plane of each ring is substantially normal to a tangent to the work piece path at the point of intersection of the ring therewith.

The annular rings 23, 24 are of unequal diameter, and ring 23 which has the smaller diameter is located closest to the starting point of the carriage which is adjacent the rear edges of the side members 15, 16 as indicated in Figure 1. The rings are rotatably supported by the rollers 25 and are driven to effect cutting engagement with the work piece by means of thin, flexible bands 31, 32 which overlie the upper halves of the rings and extend downwardly to pulleys 34, 35, the pulley for each ring having approximately the same size as the ring and being substantially coplanar therewith. The pulleys are driven by motors 37, 38 secured to the right hand side member 16 in a manner to be described. Since the annular rings 23, 24 are positioned in divergent planes and their corresponding pulleys 34, 35 are coplanar therewith and spaced therebelow, the drive bands 31, 32 cross one another as shown in Figure 1, with the band 31 for the smaller ring 23 passing inside the band 32 for the larger ring.

Figure 2:
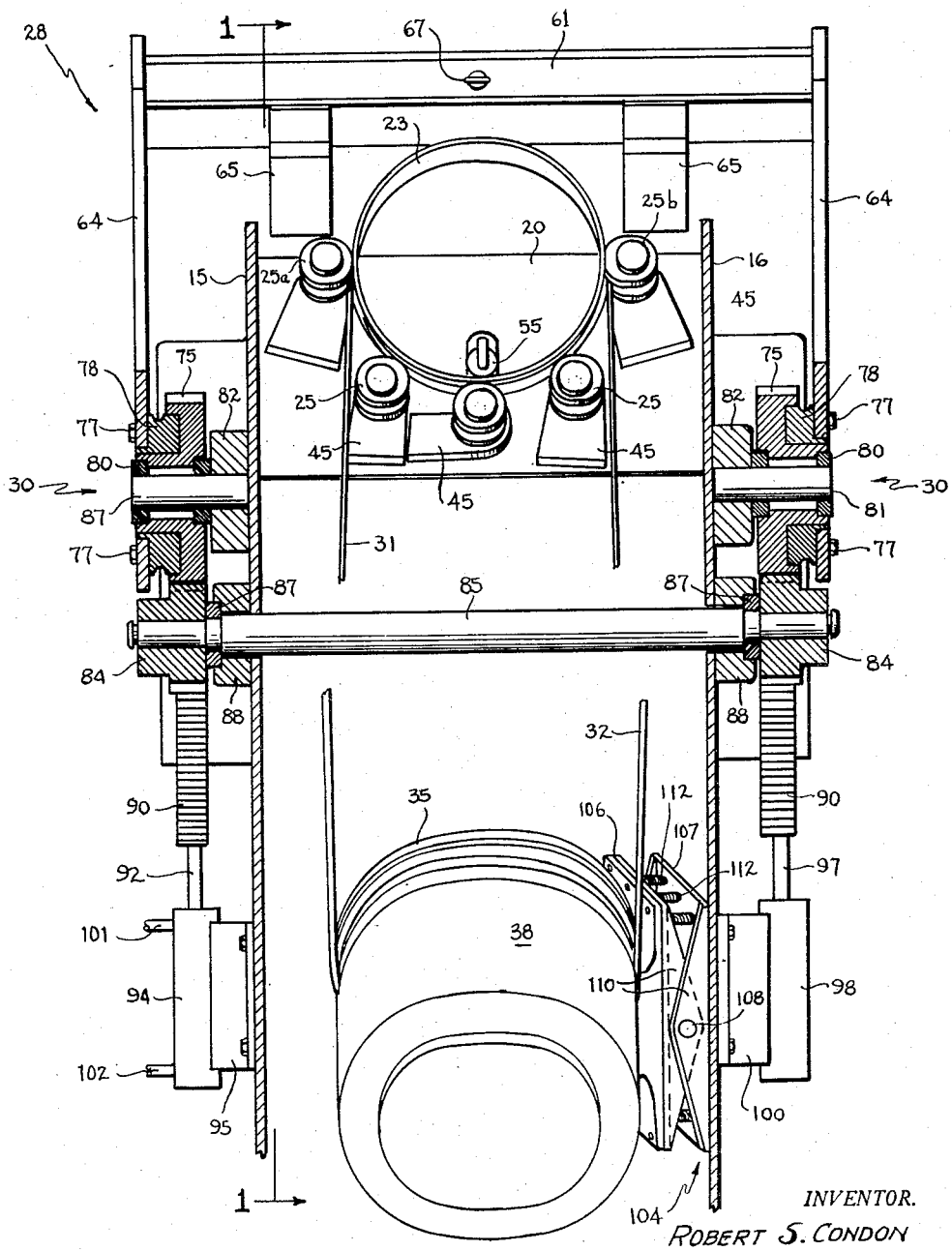
Figure 2 is a section through the machine taken substantially along line 2—2 of Figure 1.

Each of the annular rings 23, 24 is formed with a centrally disposed raised rib 40 which extends circumferentially about its outer edge and serves as a guide for the engagement of the rings with the rollers 25. Each roller 25, Figures 1, 2 and 4 is supported by bearings 41 which are held in position on a pin 42 by collars 44. The pins 42 are mounted in brackets 45 which are secured to the plates 20, 21 in an adjustable manner to permit all of the rollers to be brought to bear evenly against the rings. To this end, the plates 20, 21 are provided with a pair of oversized holes 47 for each bracket and the pin 42 extends through one of these holes and has positioned thereon an eccentric bushing 48 which also extends into the hole. The bushing is formed with a flange 50 which abuts against the bottom of the plate and is held thereagainst by a nut 51 threaded onto the end of the pin. A bolt 52 is passed through the other hole 47 and threaded into the base of the bracket 45. With this arrangement, the bolt 52 may be loosened slightly, and the eccentric bushing 48 rotated until the roller is brought into proper engagement with its annular ring. The bushing flange 50 may then be dowelled to the plate as at 54 and the bolt 52 tightened to maintain the bracket and roller in properly adjusted position.

As best shown in Figure 2, five rollers 25 are used to support each annular ring, although this number may be varied for sets of rings of different sizes. All of these rollers are located adjacent the lower portions of the rings so that the upper portions thereof are unsupported except for the drive bands 31, 32 and can project above the upper edges of the plates 20, 21 for cutting engagement with the work piece. However, in order to prevent the rings from flying out of the machine in the event that either of the drive bands should break, an additional roller 55 is mounted on each of the supporting plates for engagement with the inside of its ring as shown in Figures 1 and 2.

The cutting means for the rings 23, 24 comprises a plurality of independent saw teeth 57, and preferably these teeth are supported on the rings by securing them to the leading edges thereof as by rivetting or welding. Alternate teeth have oppositely offset cutting edges 57 as shown in the greatly enlarged view of Figure 6 so that the kerfs formed in the work piece will be sufficiently wide to accommodate the thickness of the rings and allow the work piece to pass freely therebeyond. With the saw teeth supported in this manner, the drive bands 31, 32 can engage the rings on the opposite sides of the raised ribs 40 from the teeth as indicated in Figure 6, or the teeth can be secured to the insides of the rings at the leading edges and the bands positioned on the same sides of the ribs as the teeth.

As an alternative to attaching the saw teeth 57 directly to the rings as above described, the teeth can also be supported thereon by securing them to the drive bands 31, 32 as shown in Figure 5. In such case, somewhat wider bands would be desirable so that the attachment means for the teeth would lie beyond the edge of the rings and would not interfere with the close engagement of the bands therewith. In this connection, it will be noted from Figure 2 that the only places that the supporting rollers 25 engage the drive bands as well as the rings are at the sides of the rings where the bands are engaged by the uppermost rollers 25a, 25b. To compensate for the band thickness at these points, the rollers 25a, 25b are formed with a slightly smaller bell at one end 60 thereof as indicated in Figure 5.

The work piece supporting carriage, Figures 1 and 3, comprises a pair of horizontal channel beams 61, 62 which are held in spaced, parallel relation by being secured to the divergent ends of a pair of V-shaped side arms 64. The carriage side arms straddle the machine side members 15, 16 as best shown in Figure 2 and are pivotally secured thereto in a manner to be presently described. A pair of offset straps 65 are fixed to each of the beams 61, 62 at the front edges thereof to hold a work piece 27 in position thereon. The work piece, in the manufacture of oval bowls, is a substantially rectangular slab of wood and after the slab has been positioned against the straps, it is secured to the carriage by a pair of enlarged set screws 67 which extend through the beams and enter the slab upon tightening.

One or both of the carriage side arms 64 may be provided with a forward extension 68 upon which a counterweight 70 is mounted to balance the carriage after the work piece has been positioned therein. The position of the counterweight on the extension may be adjusted to compensate for slabs of different weights, the counterweight having a stud 71 which is slidable in a slot 72 in the extension for this purpose. A nut (not shown) is threaded onto the opposite end of the stud 71 to maintain the counterweight in the adjusted position. A latch 74 is mounted on the frame side member 15, Figure 3, to maintain the carriage in its starting position before a work piece has been positioned therein, this latch being released before the carriage starts through its work stroke.

As best shown in Figure 2, each of the side arms 64 of the work piece carriage is fixed to a gear 75 as by bolts 77 which pass through an intermediate collar 78 mounted on the hub of the gear. The gears are supported by means of bearings 80 on a pair of stub shafts 81 secured in bosses 82 at oppositely disposed points on the outer sides of the frame members 15, 16. The gears 75 mesh with pinions 84 secured to the opposite ends of a transversely extending idler shaft 85, the latter being journalled in bearings 87 supported by bosses 88 mounted on the frame side members below the bosses 82. The pinions 84 are offset rearwardly with respect to the gears 75, see Figure 3, and the back of each pinion meshes with a rack 90, the upper end of which is held in engagement with the pinion by a guide bracket 91 formed integrally with the boss 88.

The lower end of the rack 90 at the left side of the machine is secured to the upwardly extending piston rod 92 of an air cylinder 94 secured as by a bracket 95 to the side member 15. The rack 90 at the right side of the machine is secured to the upstanding piston rod 97 of a hydraulic rate control mechanism 98, the latter being secured to the side member 16 as by a bracket 100. The rate control mechanism 98 is a commercially available item and is not claimed per se as a part of the present invention, the mechanism being manufactured and sold by the Bellows Falls Co. under the name "hydro check." This mechanism is designed to meter fluid for a constant rate of drive.

The air cylinder 94 is provided with the usual air hose connections 101, 102, which connect the cylinder with a suitable source of compressed air. When air is admitted to the cylinder through the upper connection 101, the piston rod 92 and rack 90 connected therewith are moved downwardly causing the left hand pinion 84 to rotate in the counter-clockwise direction as viewed in Figure 3. The rotation of the left hand pinion is transmitted through the idler shaft 85 to the right hand pinion, and together the pinions drive the gears 75 in the clockwise direction causing the carriage to move clockwise through an arcuate path from its starting position adjacent the rear of the machine frame to a stopping position adjacent the front of the frame.

While the left hand rack 90 is being driven downwardly by the air cylinder, the right hand rack is being moved in the same direction by its pinion 84. However, the downward movement of the right hand rack is controlled or snubbed by the hydraulic mechanism 98 so that the drive through the pinions and gears is constant. This arrangement is employed since it is desirable to have a compressed air drive which is in excess of the power actually needed in order to obtain good control, and the hydro check insures that this drive will be smooth and at a uniform rate throughout the work stroke.

In effecting this drive, the pinion idler shaft 85 absorbs the heavy torsion stresses, and accordingly is made of a suitable size to withstand such stresses. This relieves the work piece carriage of the major portion of these stresses, and therefore minimizes the possibility of twisting the carriage. In addition, while the carriage drive could operate through the rack, pinion and gear on the air cylinder side of the machine frame only, the provision of pinions and gears on both sides of the frame, with the power being transmitted through the idler shaft 85, further insures a uniform drive and minimum stresses for the carriage.

As may be seen most clearly in Figures 2 and 7, each of the drive motors 37, 38 for the rings, 23, 24 is secured to the frame side member 16 by an adjustable mounting generally indicated at 104. Each mounting 104 comprises a pair of identical plates 106, 107, respectively connected to the motor and side member, the plates being rockably connected together by a pin 108. Pin 108 passes through overlapping triangular side flanges 110 on the plates whereby adjacent ends of the plates may be moved towards or away from one another to raise or lower the motor in the machine frame. The outer ends of the plates 106, 107 are provided with a series of aligned holes 111, Figure 1, between which a plurality of coil springs 112 may be connected to regulate the position of each motor plate with respect to its side member plate. By using a greater or less number of springs at either the top or the bottom of the mount, the position of each motor may be adjusted within limits to place the proper tension on the drive bands 31, 32.

The operation of the saw machine in forming an oval wooden bowl is as follows: The work piece 27, in the form of a wood slab, is positioned in the carriage 28 and secured thereto by the set screws 67. The latch 74 is then released and the counterweight is adjusted on the extension 68 to balance the carriage against the weight of the slab positioned therein. The machine is then put into operation by conventional controls which start the motors 37, 38 and open the air supply to the air cylinder, the latter causing the carriage to move the slab clockwise into engagement with the cutting means supported by the rotating rings 23, 24. The slab is brought into engagement with the smaller ring 23 first and it starts to saw a kerf 114 therein, see Figures 1, 8 and 9. After the carriage has moved through an angle of approximately 100°, the slab moves into engagement with the larger ring 24 which commences to saw a kerf 115 concentric with the kerf 114 formed by the smaller ring. It will be seen from Figure 8 that at the time the larger ring engages the slab, the largest portion of the inner kerf 114 has already been made. Thereafter, as the carriage continues to move, the inner kerf is completed allowing the waste piece 117 (which is in the form of a solid semi-ellipsoid) to drop through the larger ring 24 and onto the floor, the plate 21 having a central cut away portion at 118 for this purpose. It will be noted, however, that at this time a considerable portion of the outer kerf 115 still remains to be made so that the article being formed is still firmly attached to the slab and carriage. The carriage then completes its travel until it stops against the front edges of the frame side members, and shortly before reaching this point the outer kerf is completed allowing the oval bowl that has been formed to pass inside the larger ring 24 and be caught between the carriage and a stop plate 120 extending transversely across the machine between the side members. When the carriage reaches its stopping point against the front edges of the side members it may engage an automatic cut-off (not shown) which shuts off the motors and control for the air cylinder.

It will be understood from the foregoing that the oval bowl, or segment of a torus, that is formed will have a uniform thickness throughout, and that this thickness is determined by the difference in the diameters of the two rings 23, 24. Sets of rings of different sizes can also be utilized to form different sized bowls. In every case, however, the concentric kerfs formed by the machine are in the form of true arcs of a circle in both the longitudinal and transverse direction (see Figures 8 and 9) so that finishing by machine methods is greatly facilitated.

While the invention has been described with particular reference to the manufacture of oval wooden bowls, it is not intended to restrict it to such use since the arrangement disclosed can also be advantageously employed for many other purposes. The embodiments disclosed are therefore to be considered in all respects as illustrative and not restrictive, the scope of the invention being indicated by the appended claims.

What is claimed is:

1. In a power saw, a support frame, a carriage pivotally mounted on said frame and adapted to move a work piece in an arcuate path about the carriage pivot point, air operated means to drive said carriage, hydraulic means to control the drive of said air operated means, a pair of ring members rotatably mounted in said frame with a portion of each member extending into the path of the work piece, cutting means supported by each of said ring members and engageable with said work piece to cut an arcuate kerf therein, said members being angularly displaced from one another with the plane of each being substantially normal to a tangent to the arcuate path of the work piece, one of said ring members having a smaller diameter than the other member and being located ahead of the other members in the work piece path, and power operated means to rotate said members and move said cutting means to cut said arcuate kerf during movement of said carriage.

2. A device as defined in claim 1 wherein said cutting means comprises a plurality of saw teeth fixed to said ring members.

3. A device as defined in claim 1 wherein said cutting means comprises a plurality of saw teeth fixed to a flexible band mounted on said ring members.

4. In a power saw, a supporting frame, a carriage pivotally mounted on said frame and adapted to move a work piece in an arcuate path over the top of the frame from a point adjacent one side thereof to a point adjacent the side opposite, air operated means to drive said carriage, hydraulic means to control the drive of said air operated means, a pair of ring members of unequal diameter, roller means on said frame rotatably supporting a portion of each of said ring members with an unsupported portion thereof extending into the path of said work piece for successive engagement with same, cutting means supported by each of said ring members adjacent the leading edge thereof and enterable into said work piece to cut an arcuate kerf therein, said members being angularly displaced from one another with their centers lying on an arc substantially concentric with the arcuate path of the work piece, the ring member with the smaller diameter being located closer to the starting point of the work piece path than the other member for first engagement with the work piece, and a motor to rotate each of said ring members and move said cutting means to cut said arcuate kerf during movement of said carriage.

5. A power saw as defined in claim 4 wherein said roller means comprises a plurality of roller assemblies each of which is adjustably mounted on said supporting frame.

6. A power saw as defined in claim 4 wherein said cutting means comprises a flexible band for each ring member and a plurality of saw teeth mounted on each band, said bands respectively connecting said members with the motors therefor to drive the former from the latter.

7. A power saw of the character described comprising a supporting frame including a pair of spaced side members, a carriage adapted to support a work piece and having side arms pivotally secured to said side members, a gear fixed to each of said carriage side arms, an idler shaft extending transversely of said side members, a pinion secured to said shaft adjacent each end thereof, said pinions respectively meshing with said side arm gears, a rack in mesh with each of said pinions, an air cylinder connected to one of said racks and operable through the rack, pinions and gears to drive said carriage and work piece in an arcuate path about the pivot axis of the carriage, hydraulic means connected to the other of said racks to control the drive of said air cylinder, a pair of angularly disposed cross members extending transversely between said side members, an annular saw blade rotatably mounted on each of said cross members with a portion of each blade extending into the path of the work piece for successive engagement therewith, said saw blades being positioned in divergent planes extending substantially radially from the pivot axis of said carriage, one of said blades having a smaller diameter than the other blade and being located ahead of the other blade in the path of the work piece for first engagement therewith, and power operated means to rotate said blades during movement of said carriage.

8. In a power saw, a supporting structure, a carriage movable in an arcuate path from a starting position to a stopping position about a pivot axis in said supporting structure, a pair of ring members of unequal diameter rotatably mounted in close proximity to one another in said structure in divergent planes extending substantially radially from said pivot axis, cutting means supported by each of said ring members, the upper portions of said ring members being positioned in the arcuate path of said carriage for successive engagement of the cutting means on the members with a work piece carried by the carriage to cut arcuate kerfs in such work piece, the member with the smaller diameter being closer to the starting position of said carriage than the member with the larger diameter, a pulley for each ring member, each of said pulleys being substantially coplanar with its ring member and spaced therefrom in said supporting structure, a motor to drive each of said pulleys, and a flexible band passing around each corresponding set of ring members and pulleys to rotatably drive the former.

9. A device as defined in claim 8 wherein each pulley is on the opposite side of said pivot from its ring member and said bands cross one another with the band for the smaller diametered ring member passing inside the band for the larger diametered ring member.

10. A device as defined in claim 8 wherein said motors are rockably mounted in said support structure to enable the tension on said bands to be adjusted.

11. A power saw of the character described comprising a supporting frame including a pair of spaced, parallel side members, a carriage adapted to support a work piece in a plane normal to the planes of said side members, said carriage having spaced side arms pivotally secured to said side members at oppositely disposed points thereon and being adapted to move the work piece in an arcuate path from a starting point adjacent the rear edges thereof to a stopping point adjacent the front edges thereof, first and second annular saw blades respectively located adjacent the starting and stopping points of said carriage, said second blade having a larger diameter than said first blade, each of said blades being disposed in a plane substantially normal to a tangent to the arcuate path of the work piece with the upper portions thereof extending into the path for cutting engagement with the piece, a cross member extending transversely between said side members adjacent each saw blade, a plurality of rollers on each cross member to rotatably support the lower portion of the saw blade adjacent thereto, a motor for each saw blade adjustably mounted on one of said side members, a flexible band connecting each blade with its motor to drive the former, a gear fixed to each of said carriage side arms, an idler shaft extending transversely of said side members, a pinion secured to said shaft adjacent each end thereof, said pinions respectively meshing with said side arm gears, a rack in mesh with each of said pinions, an air cylinder connected to one of said racks and operable through the rack, pinions and gears to drive said carriage and work piece into successive cutting engagement with said first and second saw blades whereby a pair of concentric arcuate kerfs are made in the work piece in both the lengthwise and widthwise directions thereof, and hydraulic means connected to the other of said racks to control the rate of the drive of said air cylinder.

12. In a power saw, a support structure, a carriage adapted to move a work piece in an arcuate path from a starting position to a stopping position about a horizontal pivot axis in said support structure, a pair of ring members of unequal diameter rotatably mounted in said structure, said ring members being angularly displaced from one another with the lower portions thereof being in close proximity and the upper portions being spaced relatively far apart, said members being mounted with the centers thereof lying on an arc concentric with the arcuate path of the work piece and with the upper spaced portions thereof projecting into said work piece path, cutting means supported by each of said ring members and engageable with said work piece to cut an arcuate kerf therein, and power operated means to rotate said members and actuate said cutting means to cut said arcuate kerfs, the upper portion of the smaller ring member being located adjacent the starting position of the carriage and the upper portion of the larger ring member being located adjacent the stopping position of the carriage whereby the arcuate kerf formed by the smaller member cutting means is substantially completed by the time the larger member cutting means starts to form its kerf.

References Cited in the file of this patent

UNITED STATES PATENTS

| 25,014 | Hay | Aug. 9, 1859 |
| 63,572 | Stearns | Apr. 2, 1867 |
| 80,382 | Barber | July 28, 1868 |
| 1,137,459 | Campbell | Apr. 27, 1915 |
| 1,597,606 | Lee | Aug. 24, 1926 |
| 2,751,941 | Smith | June 26, 1956 |
| 2,753,899 | Murfin | July 10, 1956 |
| 2,780,896 | Jaye | Feb. 12, 1957 |
| 2,782,814 | Smith | Feb. 26, 1957 |